Figure 1:
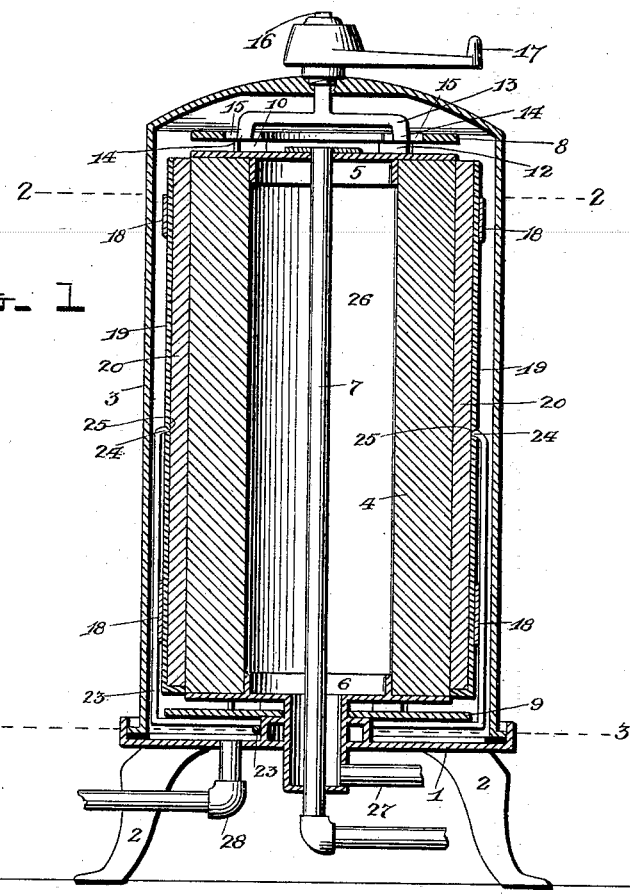

No. 628,517. Patented July 11, 1899.
D. J. BLISS & E. J. RICHMOND.
WATER FILTER.
(Application filed Sept. 20, 1898.)
(No Model.)

Witnesses

Inventors
Dwight J. Bliss and
Edward J. Richmond,
by H. B. Willson & Co.
Attorneys

UNITED STATES PATENT OFFICE.

DWIGHT J. BLISS AND EDWARD J. RICHMOND, OF CARTHAGE, MISSOURI; SAID RICHMOND ASSIGNOR TO SAID BLISS.

WATER-FILTER.

SPECIFICATION forming part of Letters Patent No. 628,517, dated July 11, 1899.

Application filed September 20, 1898. Serial No. 691,468. (No model.)

*To all whom it may concern:*

Be it known that we, DWIGHT J. BLISS and EDWARD J. RICHMOND, citizens of the United States, residing at Carthage, in the county of Jasper and State of Missouri, have invented certain new and useful Improvements in Water-Filters; and we do declare the following to be a full, clear, and exact description of the invention, such as will enable others skilled in the art to which it appertains to make and use the same.

Our invention relates to improvements in water-filters, and more particularly to that class of which the filter forming the subject-matter of Letters Patent No. 611,426, granted to us on the 27th day of September, 1898, may be taken as a type; and the objects of the present invention are to simplify and improve the construction and increase the efficiency of the filter.

To this end the invention consists in the construction, combination, and arrangement of the device, as will be hereinafter more fully described, and particularly pointed out in the claims.

The same reference characters indicate the same parts of the invention in the several views.

Figure 2:
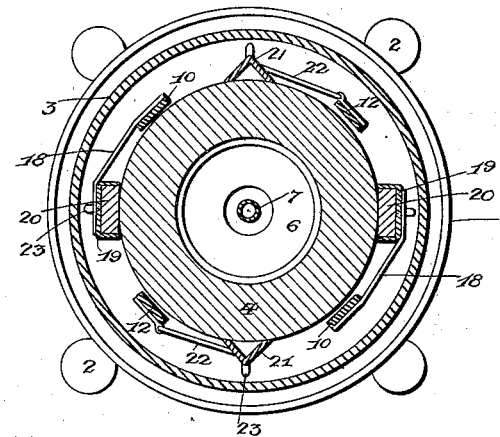
Figure 3:
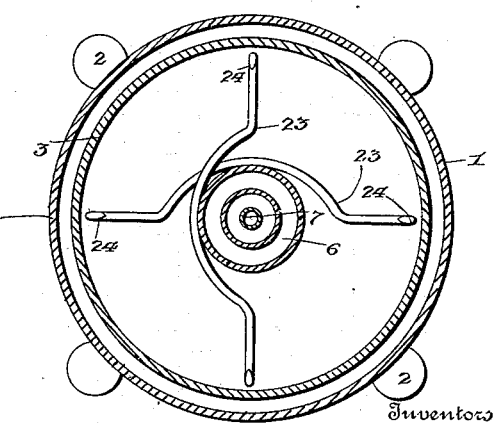

Figure 1 is a vertical section of our improved water-filter. Fig. 2 is a horizontal section on the line 2 2, and Fig. 3 is a similar view on the line 3 3.

1 denotes the base provided with the supporting-legs 2 2. 3 denotes the cylindrical shell removably secured to the base 1, so as to form a water-tight joint, and 4 denotes the fixed filtering-cylinder, which is supported between the collars 5 and 6, fixed to the vertical inlet-pipe 7.

A cylindrical cage, consisting of the top and bottom disks 8 and 9, connected by vertical parallel bars 10 10 and 12 12, encompasses the filter-chamber and is adapted to revolve freely about it in either direction, the rotation of the cage being effected by the yoke 13, the parallel depending toes 14 14 of which engage the orifices 15 15 in the top disk 8. The axial shaft 16 of said yoke extends through a stuffing-box in the top of the shell and terminates in a detachable crank-handle 17, by means of which said cage may be rotated.

To the vertical cage-bars 10 10 are fixed the spring-arms 18 18, the free ends of which carry a vertical shoe 19, which is secured to a strip or slab of stone 20, the inner face of which bears against the periphery of the filter-cylinder 4.

21 denotes a V-shaped scraper formed with parallel arms 22 22, which are hinged in the vertical bars 12 12 to permit the parallel edges of the scrapers to bear against the filter-cylinder 4, and 23 23 denote U-shaped spring-wire yokes, the upper ends of the parallel arms of which are turned inwardly to form the lugs 24 24, which engage corresponding orifices 25 in the shoes and scrapers to press them firmly against the filter-cylinder.

The water enters the filter through the inlet-pipe 7 and fills the shell 3, thence passing through the porous walls of the filter-cylinder 4 into the filtered-water chamber 26, formed between the inside walls of the filter-chamber, from whence it is drawn for use through the valved outlet-pipe 27.

28 denotes the valved waste-pipe communicating with the water-space between the shell 3 and the filter-cylinder 4.

The operation is as follows: The water to be filtered is admitted through the inlet-pipe 7 into the space between the cylinder 4 and shell 3, so as to completely encompass the cylinder 4, the pressure forcing the water through the cylinder and into the chamber 26, whence it is drawn through the outlet-pipe 27, the organic matter and mechanical impurities being separated from the water and retained on the outside of the filter-cylinder 4. When the surface of this cylinder becomes foul or clogged up, the waste-pipe 28 is opened and the cage revolved by means of its handles, which carry the stone slabs and scrapers, around the cylinder 4, so as to effectually remove the slime and organic matter from the outside wall of the cylinder, so that it may be carried out through the waste-pipe.

Although we have specifically described the construction and relative arrangement of the several elements of our invention, we do not desire to be confined to the same, as such changes or modifications may be made as clearly fall within the scope of our invention without departing from the spirit thereof.

Having thus fully described our invention, what we claim as new and useful, and desire to secure by Letters Patent of the United States, is—

1. The combination with the fixed filter-cylinder, of the rotating cage encompassing said cylinder, the friction-slabs and the scrapers formed with retaining-orifices, and carried by said cage and having a bearing against said cylinder and the U-shaped spring-yokes having their free ends engaging the retaining-orifices in said slabs and scrapers, substantially as and for the purpose set forth.

2. The combination with the fixed filter-cylinder, of the rotating cage having its upper end formed with retaining-recesses and the yoke adapted to engage said recesses and rotate the cage, substantially as shown and described.

In testimony whereof we have hereunto set our hands in presence of two subscribing witnesses.

DWIGHT J. BLISS.
EDWARD J. RICHMOND.

Witnesses:
THOS. HACKNEY,
A. L. THOMAS.